MAGNETIC STORAGE SYSTEMS

Filed April 9, 1956 3 Sheets-Sheet 1

INVENTORS:
TOM KILBURN
GEORGE RICHARD HOFFMAN

Stevens, Davis, Miller & Mosher
Attorneys

July 12, 1960 T. KILBURN ET AL 2,945,214

MAGNETIC STORAGE SYSTEMS

Filed April 9, 1956 3 Sheets-Sheet 2

INVENTORS:
TOM KILBURN
GEORGE RICHARD HOFFMAN

Stevens, Davis, Miller & Mosher
Attorneys

July 12, 1960 T. KILBURN ET AL 2,945,214

MAGNETIC STORAGE SYSTEMS

Filed April 9, 1956 3 Sheets-Sheet 3

INVENTORS:
TOM KILBURN
GEORGE RICHARD HOFFMAN

Stevens, Davis, Miller & Mosher

Attorneys 2,945,214

MAGNETIC STORAGE SYSTEMS

Tom Kilburn and George Richard Hoffman, Manchester, England, assignors, by mesne assignments, to International Business Machines Corporation, New York, N.Y., a corporation of New York Filed Apr. 9, 1956, Ser. No. 576,972

Claims priority, application Great Britain Apr. 14, 1955

13 Claims. (Cl. 340—174)

The present invention relates to magnetic storage systems, e.g. for effecting storage of binary digital information, of the type employing static magnetic cores either singly (for the storage of single binary digits) or in matrices of interlaced electrical connections (for the storage of a plurality of binary digits). In these systems each digit is recorded as the direction of magnetic polarisation induced by magnetisation of an appropriate magnetic core substantially to saturation.

In a number of previously described systems, the so-called "coincident-current" memory systems, use is made of magnetic cores which are formed of a material having a substantially rectangular hysteresis loop characteristic and a change of state of the magnetic polarisation of any core is induced by the coincident effects of two or more currents each applied in mutually aiding sense to an individual winding on the core. As a result of the rectangular hysteresis characteristic, it is possible to select the current values or magnetising ampere turns so that only the effect of two (or even more) coincident currents can cause a change of the magnetic polarisation state. Thus, in the case of a system employing two coincident-currents, each of value I/2 and each applied in the appropriate aiding sense to similar windings, the value I/2 and the magnetic characteristic of the core material must be so chosen that, whereas the current value I/2 in either one of the windings alone is ineffective to switch the state of magnetisation, current of value I in such winding or, in other words, current of value I/2 in each of the two windings simultaneously, is reliably effective to switch the magnetisation state. This coincident-current effect is used as a basis of core selection in a matrix in which the cores are threaded upon conductors in rectangular co-ordinate fashion with two conductors threading each core. By energising two intersecting conductors each with current corresponding to value I/2, none of the cores threaded by either of the conductors is effected except that which is situated at the intersection point. This particular core alone is subjected to the combined additive effect of both currents, i.e. two currents each of value I/2 corresponding to a total current value I, and is thus selected either for writing-in, by a process of switching the core magnetisation to the non-zero or "1" state, or for reading-out by switching or attempting to switch the core magnetisation to the zero state and then observing the E.M.F. which is induced in a third read-out winding which also interlinks the core. Such reading method is obviously destructive of any non-zero or "1" digit value stored therein.

In the following specification reference will be made to the following copending applications:

No. 467,583, now Patent No. 2,845,611, issued July 29, 1958, hereinafter called reference A.
No. 530,451, hereinafter called reference B.
No. 530,452, hereinafter called reference C.
No. 530,453, hereinafter called reference D.

In such references, A, B, C and D, there have been described a number of static magnetic core storage systems of the general type referred to above but in which the process of reading the information stored in a core is non-destructive, i.e. does not depend upon the switching of the state of magnetisation of a core to the zero state in order to identify the previously recorded digit value. The methods described in these references relate, however, to the reading only and in general the process of core selection for writing-in of information still requires an analogue selection method based upon the use of a core material having a hysteresis characteristic which is substantially rectangular in form.

Such analogue basis for core selection in the known systems is a serious difficulty as, in order to obtain satisfactory operation with large capacity storage systems, matching of the characteristics of the individual cores to close tolerances is necessary while the amplitude of the currents employed for effecting switching must also be closely controlled. The hysteresis characteristic of the cores must be substantially rectangular and this requirement in itself creates considerable difficulties in the fabrication of the cores themselves; the cores for example, cannot contain any air gap and if they are of metal (as distinct from powdered or ferrite cores) such metal will, in general, require very carefully controlled heat treatment in order to obtain the desired characteristics.

Objects of the present invention include the provision of improved methods of and apparatus arrangements for writing information into a magnetic core and improved methods of and apparatus for selecting, for the purpose of writing-in, any one particular core from a matrix of cores in a multi-digit storage system, which methods do not depend upon any precise analogue selection process and do not require the storage elements necessarily to have a substantially rectangular hysteresis loop characteristic or to possess any high degree of uniformity.

The response of a magnetic core of the type employed in static magnetic storage systems to a stimulating magnetising force depends to a very great extent upon the waveform and frequency of the applied magnitising force. For a core of a given material and (if it is a metal core) of a given thickness, there will be a maximum frequency for the stimulating magnetic forces above which the core will fail to respond. For example, a core made of material such as that known under the trademark "Permalloy F" in laminations of the order of 1 to 2 thousandths of an inch in thickness may be capable of being switched by a magnetising force equivalent to 1 ampere turn at zero frequency or D.C. and switching will continue to be effected so long as the magnetising current used to produce the magnetising force persists at any one time for at least a certain minimum period which may be, for example, 2 or 3 microseconds. If, however, the duration of the magnetising current is reduced below a certain minimum value, e.g. to the form of a short D.C. pulse of the order of 1 microsecond or less, the magnetisation state of the core will not be affected even if the magnetising current is increased to a value very considerably greater than that which is required to alter the state of magnetisation of the core with current pulses having a time duration above the aforesaid minimum value.

Similarly, if the magnetising force applied to the core is made to alternate, the core state will switch in sympathy with such alternations up to a certain maximum frequency but will fail to respond to alternations of higher frequency even when the magnetising current used to produce the magnetising force is very considerably increased above the value which is required to alter the state of magnetisation of the core at the lower frequencies below the aforesaid maximum value. In the example quoted above, for instance, whereas the application of 1 ampere turn, in the form of a current of 1 ampere in a one-turn winding encircling the core, is sufficient to effect switching with alternating current of a frequency of up to, say, 200–300 kc./s., a magnetising current of 10 amperes in the same winding failed to affect the core state when applied at a frequency of 500 kc./s.

The effect described above with relation to magnetising currents of alternating form is observed so long as the applied magnetising current is symmetrical, i.e. has no D.C. component and has a time-amplitude waveform whose positive and negative portions are of substantially similar form and in particular are of equal peak amplitude. It has been observed, however, that should the waveform of the applied magnetising current be non-symmetrical but still alternating, i.e. without any D.C. component, the state of magnetisation of the core may be affected and if so it will assume the state corresponding to the polarity of the maximum amplitude peaks of the exciting current. This effect has been observed for current waveforms of both distorted sine wave type (fundamental frequency plus at least second harmonic frequency) and of the repetitive pulse type of the kind in which any one pulse is of inadequate duration to switch the core.

According to the present invention a method of producing controlled magnetisation of a magnetic storage core in either one of its two opposite directions of magnetisation, comprises the steps of applying to a winding or windings on said core an alternating current of symmetrical waveform at a frequency which is in excess of the maximum frequency at which the core material will be changed in magnetisation direction by each successive half cycle of such applied current, said current having an amplitude which is in excess of that which will produce change of magnetisation direction by successive half cycles when the alternating current frequency is below said maximum frequency, thereby to subject said core material to a corresponding alternating magnetising force of symmetrical waveform and then producing an asymmetry in the waveform of said magnetising force whereby those peaks thereof which are of the polarity appropriate to effect magnetisation of the core in the required direction are of appreciably greater amplitude than those peaks which are of opposite polarity.

An apparatus arrangement in accordance with the invention for producing controlled magnetisation of a magnetic storage core in either one of its two opposite directions of magnetisation includes a first winding on said core, means for applying to said winding an alternating current which is of symmetrical waveform and which has a frequency in excess of the maximum frequency at which the core material will be changed in magnetisation direction by each successive current half cycle, said winding being arranged to be supplied from said current source with a current whose amplitude value is in excess of that which will produce a change of magnetisation direction by each successive half cycle when the frequency of such current is below said maximum frequency, whereby the core is subjected to a corresponding alternating magnetising force of symmetrical waveform and means for producing an asymmetry in said magnetising force waveform whereby the peaks of the particular polarity which are appropriate to effect magnetisation of the core material in the required direction are of appreciably greater amplitude than those peaks which are of opposite polarity.

The required asymmetry of the alternating magnetising force may be produced by the combined effects of two or more alternating currents within windings on said core, said currents each having waveforms which are symmetrical and therefore individually ineffective to change the core state. Alternatively, the required asymmetry of the magnetising force may be obtained by the use of non-linear elements such as diodes introduced into a circuit which is magnetically coupled to the core.

Yet a further method of obtaining the requisite asymmetric effect is one involving the use of magnetic cores each provided with means, such as a hole therethrough and arranged for variation of the reluctance of the magnetic circuit therein in a manner resembling that described for reading-out purposes in the aforesaid reference C.

The invention provides the basis of a coincident current method and arrangement of effecting core selection in a matrix of cores which does not rely upon any precise control of the amplitude of the applied currents or upon substantial uniformity of the magnetic characteristics of the various individual cores which form such matrix.

In order that the invention may be more readily understood it will now be described in greater detail with reference to the accompanying drawings, in which.

Figure 3:
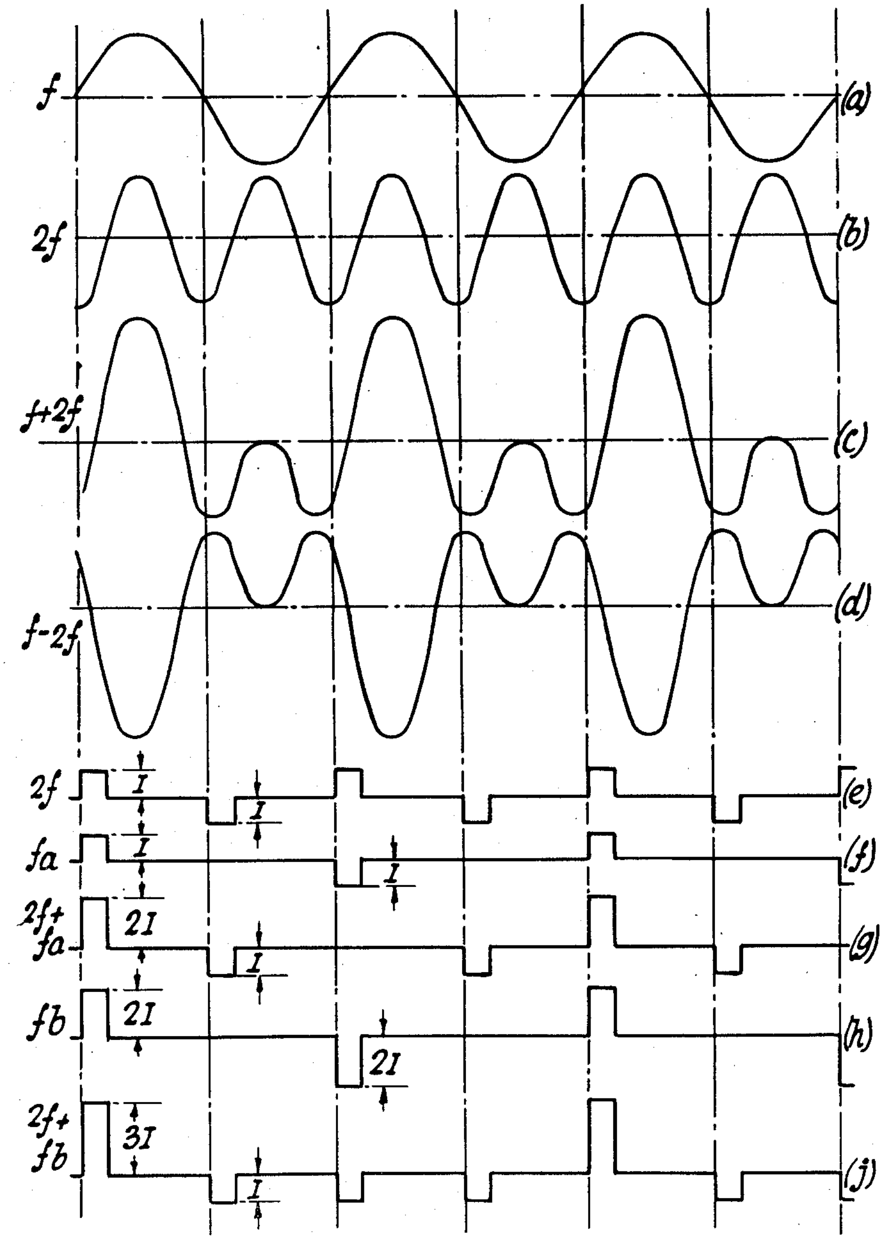

Fig. 3 comprises a series of electric waveform diagrams.

Figure 4:
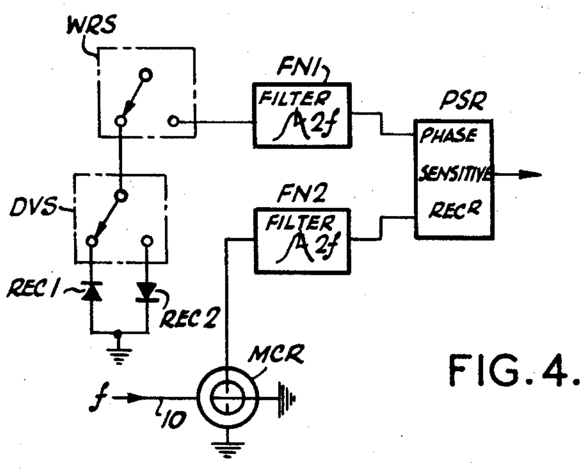
Figure 2:
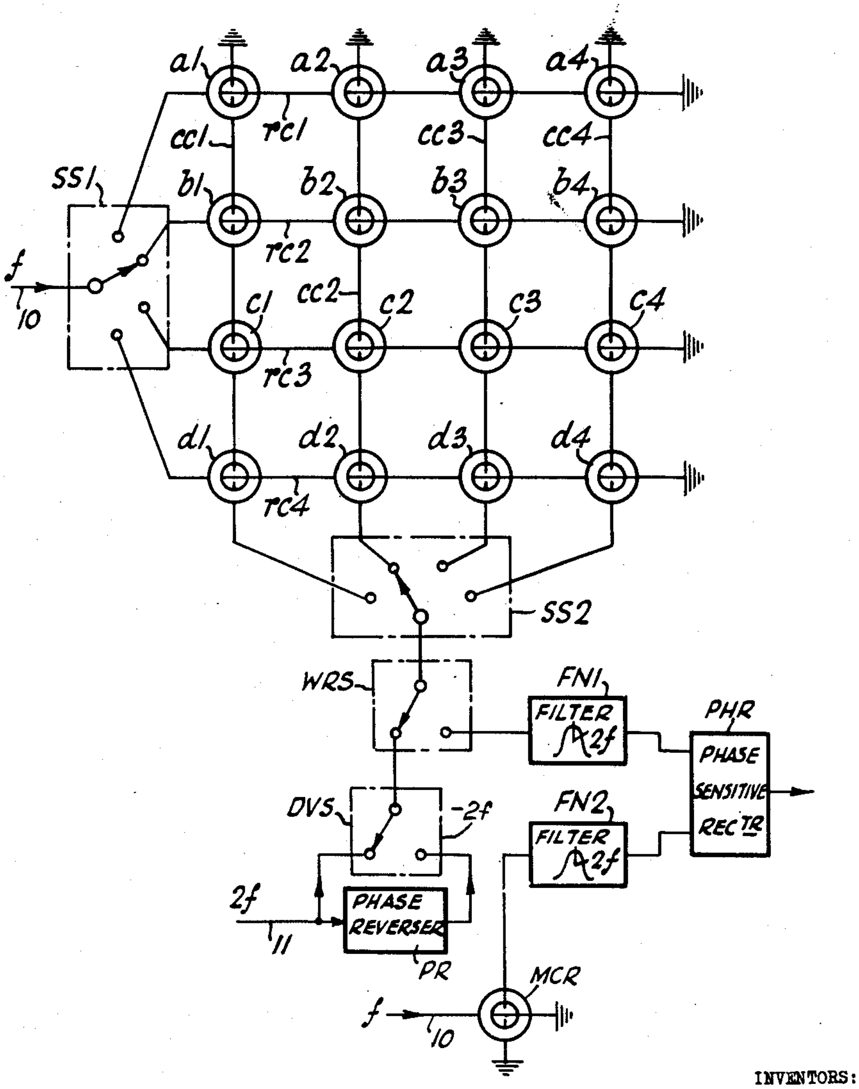
Fig. 2 illustrates one manner of application of the invention to the selective switching or writing-in of a particular core within a matrix of cores and to the reading-out from any core of such matrix.

Fig. 4 is a fragmentary view showing a modification of the arrangements of Fig. 2.

Figure 1:
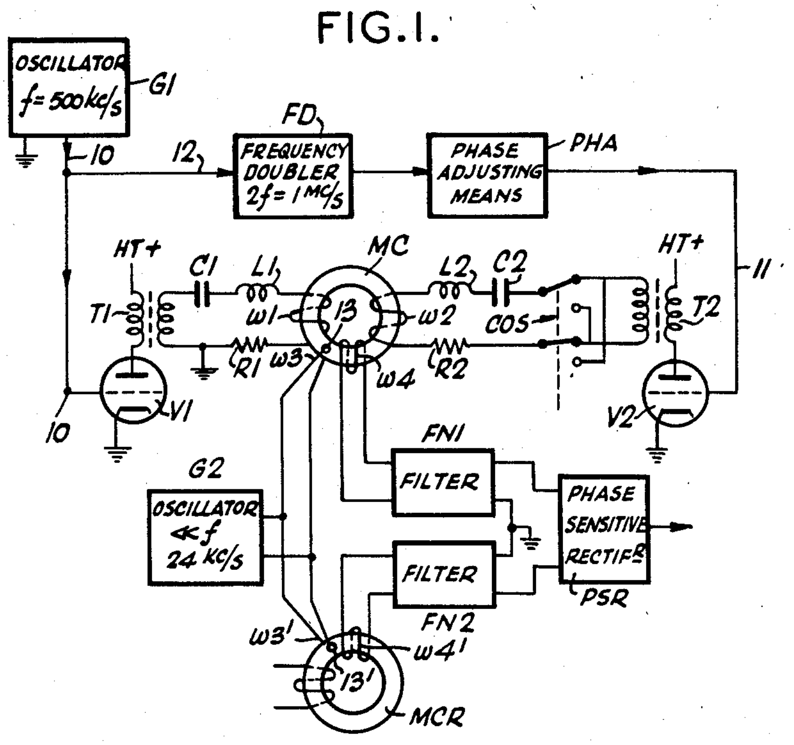
Fig. 1 shows one apparatus arrangement according to the invention embodying a single magnetic storage core and particularly adapted for use as an experimental equipment for demonstrating the method of the invention.

Referring first to Fig. 1, the arrangement shown therein comprises a core ring MC of suitable magnetic material such as the aforementioned Permalloy F and having two separate windings *w*1 and *w*2. The winding *w*1 (20 turns) is supplied by way of a filter network tuned to frequency $f=500$ kc./s. and comprising serially connected capacitor C1 and inductance L1 from the secondary winding of a transformer T1 whose primary winding is connected in series between the anode of a first triode thermionic valve V1 and its source of positive anode potential HT+. The resistor R1 also connected in series between winding *w*1 and transformer T1 is of low value (6 ohms) and is provided for the purpose of measuring the current flow by means of an oscilloscope. The cathode of valve V1 is connected to earth and its control grid is supplied over lead 10 with the output (at said frequency *f*) of an oscillator G1 of any suitable form.

The second winding *w*2 (20 turns) of the core MC is connected by way of a further filter network tuned to frequency $2f=1$ mc./s. and comprising serially connected inductance L2 and capacitor C2 to the secondary winding of a further transformer T2 whose primary winding is connected in series between the anode of a second triode valve V2 and its source of positive anode potential HT+, in a manner generally similar to that of valve V1. Resistor R2 (6 ohms) is provided for the same purpose as resistor R1. The cathode of valve V2 is also earthed and the control grid of valve V2 is supplied over lead 11 with the output (at said frequency 2*f*) of a frequency doubler circuit FD whose input is derived over lead 12 from the output lead 10 of the oscillator G1 already referred to. The frequency doubler circuit FD can be of any suitable and well known form whereby the valve V2 is always supplied with an alternating current having a frequency exactly twice that applied to the valve V1 and having a rigid phase relationship therewith. Preferably the lead 11 includes phase-adjusting means PHA of any suitable known form for obtaining initially an optimum phase relationship between the two frequencies $f1$ and $f2$ which are present respectively in windings *w*1 and *w*2.

Included between the filter network L2, C2 and the secondary winding of the transformer T2 is a change-over switch COS arranged to permit connection of the winding *w*2 to the secondary winding of the transformer T2 in either of the two alternative senses. This phase-reversing switch COS is conveniently, for experimental purposes, in the form of a mechanical vibrator switch operating at a frequency of, say, 100 c.p.s. but in a practical application circuit it would be either a manually controlled switch or an electronic switch controlled by a digit-value representing signal. Such switch COS controls the direction of magnetisation of the core MC and is therefore, effectively, a digit-value control switch.

In one particular apparatus arrangement according to Fig. 1, the currents at frequencies *f* and 2*f* were each adjusted to provide a magnetising force of 13 ampere turns in the core ring MC but the system operated reliably when the currents were each reduced to a value at which they each provided a magnetising force of only 5 ampere turns. The corresponding D.C. magnetising force sufficient to switch the core state was only 1 ampere turn.

The state of magnetisation of the core MC may be observed by any convenient method, for example and as shown by the *f*, 2*f* method, utilising a hole in the magnetic core ring as described in reference C. For this purpose the core ring MC is provided with a small hole 13 located approximately midway of the radial thickness of the ring and is threaded by a winding *w*3 of one (or more) turns. This winding is connected to a source of oscillations G2 having a frequency which is low compared with that of the oscillator G1 and which is preferably not harmonically related thereto. Such frequency should, however, be several and, preferably, many times greater than the switching frequency of the switch COS. A frequency *fs* of, say, 24 kc./s. is suitable.

A further read-out winding *w*4 is provided on the core ring MC and is connected to a filter network FN1, such as a series resonant circuit, tuned to a frequency 2*fs*. The output from this network FN1 is applied to one input of a phase-sensitive rectifier USR, the other input of which is supplied from a second similar filter network FN2 which is connected to the read-out winding *w*4′ of a second similar core MCR. Such second core is also provided with a hole 13′ threaded by a winding *w*3′ which is energised from oscillation source G2. The second core MCR is held magnetised continuously in one polarisation direction and, as described in the aforesaid reference C, acts as a reference or standard for supplying an output at frequency 2*fs* whose phase relationship to the output, also at frequency 2*fs*, of the core MC, is compared in the phase-sensitive rectifier PSR. As the phase of the output from core MC alters according to the magnetisation direction of such core, the output signal from circuit PSR is indicative of which of the two opposing directions of magnetisation exists in ring MC at any instant.

In alternative schemes, observation may be effected by the non-destructive reading methods described in references A and B.

When the system as shown in Fig. 1 was operated it was observed that the state of magnetisation of the core MC was being switched in step with operation of the switch COS, i.e. at the vibrator frequency. Such switch was repeatedly reversing the phase of the second harmonic component 2*f* applied to the winding *w*2. As in this system, the amplitude of the currents at frequencies *f* and 2*f* may be considerably greater than the steady currents required to switch the core, it is clear that the effectiveness of switching of the core and the time required for the switching process will depend upon the relative magnitude of the positive and negative excursions of the composite *f*+2*f* magnetisation force waveform which is effective in the core MC. Satisfactory switching could not be expected with a difference between positive and negative peak amplitudes less than that corresponding to 1 ampere turn in the case of the particular core employed in these experiments.

The oscillations at frequencies *f* and 2*f* provided respectively by oscillator G1 and frequency doubler circuit FD may be of sinusoidal form as shown in Fig. 3*a* and Fig. 3*b* in which case the resultant asymmetrical alternating magnetising force applied to the material of the core is indicated by the diagrams of Fig. 3*c* and Fig. 3*d* for the two alternative, mutually antiphase, relationships of the frequency 2*f* to the frequency *f*. The optimum phase relationship between the two frequencies (obtained by adjustment of circuit PHA) is when alternate peaks of the 2*f* frequency coincide with the peaks of the *f* frequency as shown. With one sense of connection of the frequency 2*f*, the positive-going peaks of the magnetising force alternations have a much larger amplitude than the negative peaks whereas the opposite sense of connection of such 2*f* frequency provides negative-going peaks of the magnetising force alternations which are of much larger amplitude.

Instead of sinusoidal magnetising currents it is possible to employ pulse waveforms such as those shown in Figs. 3*e*–3*f*. Thus, Fig. 3*e* illustrates a square pulse waveform having alternate pulses of opposite polarity and having a pulse recurrence frequency of, say, 1 mc./s. while Fig. 3*f* shows a similar square pulse waveform also having alternate pulses of opposite polarity and having a fundamental pulse recurrence frequency of only 500 kc./s. The respective pulses of the waveforms of Fig. 3*e* and Fig. 3*f* have a common amplitude I and the respective pulses are also of equal time duration, alternate pulses of the 2*f* waveform, Fig. 3*e*, being precisely synchronous with the pulses of the *f* waveform, Fig. 3*f*. One resultant magnetising force waveform obtained by application of the recurrence having waveforms according to Figs. 3*e* and 3*f* is shown in Fig. 3*g* where two coincident positive-going pulses combine to provide a positive magnetising pulse of amplitude 2I recurring at a frequency of 250 kc./s., the corresponding negative-going pulses being of twice the frequency, i.e. 500 kc./s. but of only half the amplitude. If desired one of the waveforms may have a pulse amplitude greater than the other, for example, as shown in Fig. 3*h* where the component *fb* has a pulse amplitude 2I. After combination with the 2*f* component (Fig. 3*e*) the resultant magnetising force diagram is as shown in Fig. 3*j* where a magnetising pulse of positive polarity and amplitude 3I is provided at a frequency of 250 kc./s. balanced by three intervening negative-going pulses each of amplitude I.

The use of pulse waveforms may be more convenient from the point of view of handling, gating and the like than the use of sinusoidal waveforms. The pulse duration of each pulse will, of course, be such that no single pulse can produce a magnetic change of state in any core.

One manner in which the invention may be applied practically to the selection of one desired core from among a matrix of cores is shown in Fig. 2 where a group of four cores *a*1, *a*2, *a*3, *a*4 constitute one row of the matrix, a similar group of cores *b*1, *b*2, *b*3, *b*4 a second row, a further similar group of cores *c*1, *c*2, *c*3, *c*4 a third row and a further similar group of cores *d*1, *d*2, *d*3, *d*4 a fourth row. Each of the cores of the first row *a*1 . . . *a*4 are threaded by a row conductor *rc*1 connected to one selection terminal of a first selector switch means SS1. The second row of cores *b*1 . . . *b*4 is likewise threaded by a row conductor *rc*2 connected to the second selection terminal of the switch means SS1 while the third and fourth rows of cores are likewise threaded by individual row conductors *rc*3 and *rc*4 which are connected respectively to the third and fourth selection terminals of the switch means SS1. The cores *a*1, *b*1, *c*1, *d*1 are likewise threaded by a common column conductor *cc*1 connected to the first of the selection terminals of a second selector switch means SS2 while the remaining three column groups of cores *a*2, *b*2, *c*2, *d*2; *a*3, *b*3, *c*3, *d*3 and *a*4, *b*4, *c*4, *d*4 are likewise threaded by individual column conductors *cc*2, *cc*3 and *cc*4 connected respectively to the remaining selection terminals of the switch means SS2. The switch means SS1 and SS2 are shown schematically as simple multi-point switches but in practice they would, of course, usually be some other and fast operating signal-controlled means such as electronic gate circuits.

The input terminal connection of the switch means SS1 is connected to the output lead 10 carrying the frequency *f* from the oscillator G1 of Fig. 1 while the corresponding common terminal of the switch means SS2 is connected to the common terminal of a write-read switch WRS. One selection terminal of this switch is connected to the common terminal of a further change-over digit-value switch DVS whose opposite selection terminals are connected respectively to the lead 11 carrying the frequency 2*f* from the frequency doubler circuit FD of Fig. 1 and the output at frequency —2*f* of a phase reversal circuit PR whose input is also supplied from the lead 11. By appropriate operation of the switch means SS1 and SS2 the frequency *f* may be applied to any chosen row conductor of the group *rc*1 . . . *rc*4, and, with switch WRS in the "write" position shown, the frequency 2*f* applied to any chosen column conductor of the group *cc*1 . . . *cc*4. Each of the cores in the selected row, for example, the second row threaded by conductor *rc*2 will be supplied with alternating current at frequency *f*, e.g. as shown in Fig. 3*a*, Fig. 3*f* or Fig. 3*h*. Since such current has a waveform which is symmetrical and has a frequency above that of the critical switching frequency, the magnetic states of none of the cores *b*1, *b*2, *b*3, *b*4 will be effected thereby. Similarly, the application of the frequency 2*f* shown in Fig. 3*b* will be ineffective, by itself, upon each of the cores of the selected column, for instance, the second column which is threaded by the conductor *cc*2. In the single core *b*2 which is subjected to both of the input frequencies however, the resultant magnetising force will be either that shown in Fig. 3*c* or that shown in Fig. 3*d* in the case of sine wave inputs or the equivalents in the case of pulse form inputs, the form in each case being dependent upon the positioning of the digit value switch DVS. As the magnetisation force waveform is now asymmetrical the one particular core *b*2 lying at the intersection of the selected row and column conductors will be switched to the state dependent upon the polarity of the aforesaid maximum peaks. Thus, there is complete control of the writing-in operation to any one of the cores of the matrix of cores by appropriate setting of the switch means SS1 and SS2 and the appropriate positioning of the switch DVS according to the required core state.

In practice, of course, the arrangements for providing the frequency *f* and the two opposite phases of the frequency 2*f* would consist of means for feeding trains of oscillations of the necessary time duration and would include suitable electronic controlled gating means for precisely determining the duration time of the trains. The switching means DVS would be of electronic character controlled by the signalled value of the required digit to be stored thereby to effect the appropriate phase selection of the frequency 2*f*. Such electronic elaborations are not, however, shown in the interests of simplicity.

The writing arrangements described above may very conveniently be employed in conjunction with the reading process which is described in the aforesaid reference B. The necessary means for this purpose are shown in Fig. 2 where the opposite selection terminal of the write/read switch means WRS is connected by way of filter FN1 to one input of a phase-sensitive rectifier PHR, the other input of which is supplied by way of filter FN2 from one winding or conductor of a standard or reference core MCR. The other winding or conductor of this core MCR is supplied with current from the oscillator G1.

With such arrangement, during reading the frequency *f* is applied to the row conductor which threads the required core of the matrix. The phase of the resultant 2*f* harmonic output on the column conductor which also threads the required core, relative to the reference phase from the core MCR, may then be employed to identify the digit value which is registered in the selected core, i.e. the core lying at the intersection of the active row and column conductors. The elements FN1, FN2, MCR and PHR of Fig. 2 are similar to those referred to in connection with Fig. 1.

Alternative reading arrangements may be used. For instance the cores may be provided with auxiliary windings or with arrangements for forcing current through the material of the cores themselves in order that the reading methods of the aforesaid reference C may be employed in a manner which will be self-evident, one of the writing conductors being employed as the means for delivering the read out signal.

The writing process of the present invention may also be used in conjunction with arrangements designed for the conventional destructive reading method of having a single read out winding threading all cores.

The invention includes also methods of operation and arrangements other than those described above in which the effectiveness of the back swings of an alternating and symmetrical magnetising current are reduced. Another way of producing the required effect is illustrated in the fragmentary view of Fig. 4 which shows a modified form of the lower part of Fig. 2. In this modification, the switching means DVS serves to couple one or the other of two rectifiers REC1, REC2, which are oppositely polarised, in series with the chosen column conductor *cc*1 . . . *cc*4. By the provision of such alternative choice of oppositely polarised diodes, the magnetising force applied to the core which is intersected by the chosen row and column conductors, for instance, the core *b*2, will be rendered asymmetrical by reduction of amplitude of either the negative or the positive half-cycles according to which one of the rectifiers REC1, REC2 is in use.

Yet a further alternative arrangement also makes use of the core constructions described in the aforesaid reference C. With this further modified arrangement the two symmetrical alternating current components, for instance, 2*f*1 and *f*1, are fed, one to a main winding threading the core and the other to the auxiliary winding threading the hole in the limb of the core, the higher frequency component being always supplied to the main winding. With such a system the 2*f* component will, by itself, have no effect neither will the *f* component, the only effect of which latter is to modulate the reluctance of the core in the neighbourhood of the hole therein. However, by arranging that the periods of non-saturation produced by the lower frequency current *f*, occurring twice per cycle, coincide with either the positive or the negative peaks of the higher frequency current 2*f* in the main winding, the magnetising force waveform can be rendered asymmetrical and a corresponding switching of the core state will result. Such an arrangement can clearly be adapted to a matrix storage system and used in conjunction with the non-destructive reading process of such reference C by employing the main winding (which would be a row or column conductor) as the read out winding producing a signal of frequency 2*f* and of a phase indicative of the digit stored as the result of feeding a signal of frequency *f* to the auxiliary winding which would be in series with the equivalent windings of the other cores of a column or row as the selected column or row conductor.

Although the operation and the invention have been described above with reference to the super-position of pulse waveforms of frequencies *f* and 2*f* or of sinusoidal currents of frequencies *f* and 2*f*, more complex waveforms comprising a higher order of harmonics may be employed to produce greater asymmetry of the resulting magnetising force waveform. Similarly, although the invention has been more particularly described with relation to storage matrices, it clearly has equal application to the switching-core matrices which are widely used for the control of such storage matrices and the like.

We claim:

1. Apparatus for producing controlled magnetisation of a magnetic storage core in either one of its two opposite directions of magnetisation which includes a first winding on said core, a first source of a first alternating current of symmetrical waveform, said source having a frequency in excess of the maximum frequency at which the core material will be changed in magnetisation direction by each successive half cycle when said current is applied to said first winding, means for supplying a current from said first current source to said winding whose amplitude is in excess of that which would produce a change of magnetisation direction by each successive half cycle when the frequency of the applied first alternating current is below said maximum frequency, whereby said core is subjected to a corresponding alternating magnetising force of symmetrical waveform and means for producing an asymmetry in said magnetising force waveform whereby those peaks thereof which are of the polarity appropriate to effect magnetisation of the core material in the required direction are of appreciably greater amplitude than those peaks which are of opposite polarity.

2. Apparatus according to claim 1 in which said alternating current source is arranged to supply current having a sinusoidal waveform.

3. Apparatus according to claim 1 in which said alternating current source is arranged to supply current having a square pulse waveform.

4. A magnetic core storage device as claimed in claim 1 which includes reading-out means, said reading-out means comprising further switch means for replacing the connection of one of said sources of alternating current to the related selector switch means by a connection of said switch means to means for determining the phase, relative to a reference phase, of the output which is derived from a selected matrix conductor through said selector switch means at a frequency which is harmonically related to the frequency of the other of said alternating current sources.

5. In a magnetic core storage device comprising a magnetic storage core of retentive magnetic material, means for producing controlled permanent magnetization of said core in either of its two opposite magnetization directions, said means comprising a first winding on said core, a second winding on said core, a first source of alternating current of symmetrical waveform connected to said first winding to produce an alternating magnetizing force of symmetrical waveform in said core, and a second source of alternating current of symmetrical waveform connected to said second winding to produce an alternating magnetizing force of symmetrical waveform in said core, each of said first and second alternating currents having a frequency which is greater than the frequency at which the core material will be changed in magnetization direction by each successive half cycle of said alternating current and said second source having a frequency which has an even harmonic relationship to said first alternating current, and phase adjusting means connected between at least one of said first and second sources and its associated first and second winding to establish alternative phase relationships between said currents such that the resultant magnetizing force in said core has an asymmetrical waveform of which the peaks of one polarity are of appreciably greater amplitude than the peaks of opposite polarity, said greater amplitude peaks corresponding with the desired direction of magnetization of the core material.

6. Apparatus according to claim 5 which includes means for reversing the phase relationship of said second alternating current.

7. Apparatus according to claim 6 in which said alternating current sources have means to supply currents each having a square pulse waveform and in which the pulses of said second alternating current have a time duration appreciably less than the half cycle period time and in which the pulses of said first alternating current have the same time duration as those of said second alternating current and coincide in timing with pulses of said second alternating current.

8. Apparatus according to claim 7 in which said second alternating current has a frequency twice that of said first alternating current and in which the pulse amplitude of said first alternating current is arranged to be twice that of the pulse amplitude of said second alternating current.

9. Apparatus according to claim 5 in which said asymmetry producing means comprises a second winding on said core and a unilaterally conductive device adapted to be connected in series with said second winding.

10. Apparatus according to claim 9 which includes means for reversing the polarity of said asymmetrical conductive means.

11. A magnetic core storage device comprising a matrix of separate magnetic storage cores each arranged in accordance with claim 5, a set of row conductors each threading each of the cores in a different one of the rows in said matrix and a set of column conductors each threading each of the cores in a different one of the columns in said matrix, first selector switch means for connecting said first source of alternating current to any one of said row conductors and second selector switch means for connecting said second source of alternating current to any one of said column conductors whereby asymmetry in the waveform of the magnetising force of the core which is intersected by the energised row and energised column conductors is produced to effect magnetisation of the aforesaid core in one or the other of the two opposing directions according to the polarity of the maximum amplitude peaks of said magnetising force waveform.

12. Apparatus according to claim 5 which includes means for reversing the phase relationship of said second alternating current and in which said alternating current sources have means to supply currents each having a sinusoidal waveform and in which said second alternating current is the second harmonic of said first alternating current.

13. Apparatus according to claim 5 which includes means for reversing the phase relationship of said second alternating current and in which said alternating current sources have means to supply currents each having a square pulse waveform, said second pulse waveform being the second harmonic of said first pulse waveform and in which the pulses of said second alternating current have a time duration appreciably less than the half cycle period time and in which the pulses of said first alternating current have the same duration as those of said second alternating current and coincide in timing with the pulses of said second alternating current.

References Cited in the file of this patent

UNITED STATES PATENTS

| | | |
|---|---|---|
| 2,574,438 | Rossi et al. | Nov. 6, 1951 |
| 2,614,167 | Kamm | Oct. 14, 1952 |
| 2,697,825 | Lord | Dec. 31, 1954 |
| 2,845,611 | Williams | July 29, 1958 |

OTHER REFERENCES

An article entitled: "A Radio-Frequency Nondestructive Readout for Magnetic-Core Memories," by Bernard Widrow, published in the December 1954, issue of IRE Transactions-Electronic Computers, pp. 12–15.